US012774043B2

(12) United States Patent
Leon et al.

(10) Patent No.: US 12,774,043 B2
(45) Date of Patent: Oct. 27, 2026

(54) LOAD-HANDLING VEHICLE

(71) Applicant: MANITOU BF, Ancenis (FR)

(72) Inventors: David Leon, Ancenis (FR); Thierry Lehmann, Ancenis (FR)

(73) Assignee: MANITOU BF, Ancenis (FR)

( * ) Notice: Subject to any disclaimer, the term of this patent is extended or adjusted under 35 U.S.C. 154(b) by 543 days.

(21) Appl. No.: 18/546,506

(22) PCT Filed: Feb. 11, 2022

(86) PCT No.: PCT/FR2022/050252
§ 371 (c)(1),
(2) Date: Aug. 15, 2023

(87) PCT Pub. No.: WO2022/180317
PCT Pub. Date: Sep. 1, 2022

(65) Prior Publication Data

US 2024/0132163 A1 Apr. 25, 2024
US 2024/0227951 A9 Jul. 11, 2024

(30) Foreign Application Priority Data

Feb. 25, 2021 (FR) ...................................... 2101826

(51) Int. Cl.
*B62D 33/06* (2006.01)
*B60R 3/00* (2006.01)
*B66F 9/075* (2006.01)

(52) U.S. Cl.
CPC ................ *B62D 33/06* (2013.01); *B60R 3/00* (2013.01); *B66F 9/0759* (2013.01)

(58) Field of Classification Search
CPC .......... B62D 33/06; B60R 3/00; B66F 9/0759
See application file for complete search history.

(56) References Cited

U.S. PATENT DOCUMENTS 5,405,028 A * 4/1995 Kaspar .................. B62D 33/06 180/327
2012/0145875 A1* 6/2012 Haller ...................... B60N 2/50 248/636
(Continued)

FOREIGN PATENT DOCUMENTS

GB 1427076 A 3/1976

OTHER PUBLICATIONS

International Search Report and Written Opinion mailed Jun. 15, 2022 for international patent application No. PCT/FR2022/050252.

*Primary Examiner* — Brian L Swenson
(74) *Attorney, Agent, or Firm* — Husch Blackwell LLP

(57) ABSTRACT

A load-handling vehicle including a chassis, a handling system including a lifting arm moveable between a high and a low position and a cab including a floor, a roof, a front face, an opposite rear face and two side faces, one of the side faces being provided with an opening for accessing the cab, and the other side face being adjoined by the lifting arm in the low position, the cab having a seat having at least one seat index point defined by international standard ISO 5353:1995. The cab has a minimum interior height measured between the floor and the ceiling greater than 1705 mm, and a distance between the floor and the ground less than 800 mm, and the distance between the seat index point and the floor of the cabin is at least 650 mm.

20 Claims, 8 Drawing Sheets

(56) References Cited

U.S. PATENT DOCUMENTS

| | | | | |
|---|---|---|---|---|
| 2013/0058747 | A1 * | 3/2013 | Kimura | B62D 33/0617 414/744.2 |
| 2016/0009321 | A1 | 1/2016 | Burgess | |
| 2016/0244945 | A1 * | 8/2016 | Panneer | E02F 9/0833 |
| 2017/0182946 | A1 | 6/2017 | Iotti | |

* cited by examiner

LOAD-HANDLING VEHICLE

TECHNOLOGY FIELD

The present disclosure relates to a load-handling vehicle.

BACKGROUND

Such a handling vehicle, as described in document US 2017/182946, is well known to those in the art and, particularly when the arm is a telescopic arm, allows a load to be handled at great height. The lateral positioning of the lifting arm allows good visibility of the front of the vehicle. In order also to maintain good peripheral visibility, it has hitherto been necessary to use a raised cab like the one illustrated in FIG. 1, in order to offer the driver a high view. Such a solution entails fitting several steps for accessing the cab. The presence of these steps increases the risk of the driver falling or sustaining injury and increases the muscle fatigue thereof insofar as the driver of such a vehicle generally has to climb up into and down from the cab very frequently over the course of a day. Other vehicles, like those described in documents US 2016/009321 and GB 1427076, are also known.

SUMMARY

This disclosure relates in particular to a load-handling vehicle comprising a chassis able to move along the ground, a driver's cab and a load-handling system, these two being supported by said chassis, said handling system comprising at least one lifting arm mounted with the ability to move between a raised position and a lowered position and the cab comprising a floor, a roof, a front face, an opposite rear face and two lateral faces with one of the lateral faces being equipped with an opening for accessing the cab which can be closed by a door, and the other lateral face being adjacent to the lifting arm at least when said arm is in the lowered position, said cab being equipped with a seat and having at least one seat index point referred to as SIP, established and defined in accordance with International standard ISO 5353:1995, and which can be considered to be the intersection on the central vertical plane through the seat center line of the theoretical pivot axis between a driver torso and thighs.

It is an objective of the disclosure to propose a vehicle of which the design, while at the same time conforming to road standards, makes it possible to limit the risks of the driver falling and of driver muscle fatigue without detracting from the peripheral vision of the driver from inside the cab.

To that end, the subject of the disclosure is a load-handling vehicle comprising a chassis able to move along the ground, a driver's cab and a load-handling system, these two being supported by said chassis, said handling system comprising at least one lifting arm mounted with the ability to move between a raised position and a lowered position and the cab comprising a floor, a roof, a front face, an opposite rear face and two lateral faces with one of the lateral faces being equipped with an opening for accessing the cab which can be closed by a door, and the other lateral face being adjacent to the lifting arm at least when said arm is in the lowered position, said cab being equipped with a seat and having at least one seat index point referred to as SIP, established and defined in accordance with International standard ISO 5353:1995, characterized in that the cab has a minimal interior height, measured between the floor and the roof, at the seat index point SIP, greater than 1705 mm and a distance between the floor and the ground less than 800 mm when the vehicle is positioned on flat horizontal ground, and in that the distance between the or each seat index point SIP and the floor of the cab is at least equal to 650 mm. It should be noted that what is meant by the floor of the cab is, when the vehicle is positioned on a flat horizontal surface, the horizontal floor surface of the cab that is situated vertically below the seat and on which the driver's feet bear when the driver stands up from or sits down on the seat. The seat index point SIP is specified by the manufacturer of the vehicle and/or of the seat. The structural characteristics of the cab, which make it possible to meet road standards, result in the driver of the vehicle adopting a semi upright position. This position does not detract from the comfort of the driver. This semi upright position makes it possible to maintain the peripheral vision while at the same time limiting the number of steps for accessing the floor of the cab.

According to one embodiment of the disclosure, the distance between the or each seat index point SIP and the floor of the cab is less than 1045 mm. The range thus proposed for the distance between the or each seat index point SIP and the floor of the cab makes it possible for the driver of the vehicle to maintain the comfort of the seated position.

According to one embodiment of the disclosure, the vehicle has at least one step for accessing the floor of the cab. As an alternative, the vehicle may have no step for accessing the floor.

According to one embodiment of the disclosure, the vehicle has just one step for accessing the floor of the cab. This results in less muscle fatigue and a reduced risk of falling.

According to one embodiment of the disclosure, the or at least one of the steps for accessing the floor of the cab is located inside the cab. This access step is thus integrated into the cab and situated behind the access opening. This makes it possible to reduce the risks of accident. As an alternative, the or at least one of the steps for accessing the floor of the cab is located outside the cab. In this embodiment, the or at least one of the steps for accessing the floor of the cab is situated beneath the cab, under the access opening.

According to one embodiment of the disclosure, the opening for accessing the cab is delimited by an upper edge, a lower edge and lateral edges and the or at least one of the steps for accessing the floor of the cab has a tread corresponding to the flat horizontal surface of the step on which the foot is placed, located at the level of the lower edge of the opening for accessing the cab.

According to one embodiment of the disclosure, when the vehicle is positioned on a flat horizontal surface, the lower edge of the access opening is separated from the ground by a distance at least equal to 150 mm and preferably at most equal to 800 mm.

According to one embodiment of the disclosure, the floor and the step for accessing the floor and which is located immediately in front of the floor considered in relation to the direction of entry into the cab through the access opening are offset relative to one another to form stairs. This arrangement, as opposed to steps in the form of a ladder where the steps are positioned one above the other, offers greater safety when climbing up into and down from the cab.

BRIEF DESCRIPTION OF THE DRAWINGS

The disclosure will be well understood from reading the following description of exemplary embodiments, with reference to the attached drawings in which.

DESCRIPTION

Figure 1:
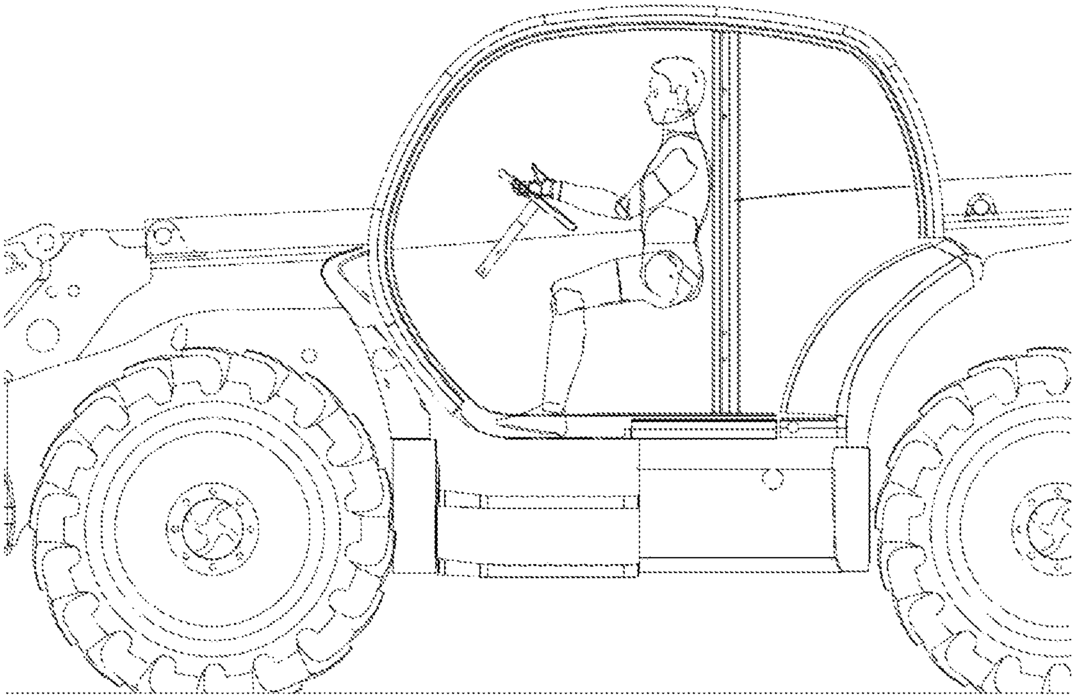
FIG. 1 depicts a partial schematic side view of a driver's cab of a vehicle of the prior art.

As mentioned hereinabove, the disclosure relates to a load-handling vehicle 1 like that depicted in FIG. 2. This vehicle 1 comprises a chassis 2 able to move over the ground and produced here in the form of a rolling chassis 2 equipped with four wheels and with a power train.

This vehicle 1 comprises a driver's cab 3 supported by the chassis 2 and inside which a driver may adopt a seated position. This vehicle 1 further comprises a load-handling system 4 comprising at least one lifting arm 5.

This lifting arm 5, which extends in the front-to-rear direction of the vehicle, is a pivoting arm mounted with the ability to pivot about an axis referred to as horizontal parallel to the plane via which the vehicle rests on the ground when the vehicle is positioned on a flat horizontal surface, so as to move the lifting arm between a lowered position and a raised position and vice versa. The pivot axis of the arm extends transversely to the front-to-rear direction of the vehicle.

This lifting arm 5 may be a telescopic arm as in the example depicted. This lifting arm 5 may be equipped, at its end, with a load-handling accessory such as forks, a gondola or the like.

The term "load" is to be understood in its broadest sense and therefore as including people.

In such a vehicle, the driver's cab 3 and the lifting arm 5 are positioned side by side along a line transverse to the front-to-rear direction of the vehicle, making it possible to have a lifting arm 5 of great length.

The cab 3 comprises a floor 6, a roof 7, a front face 8, an opposite rear face 9 and two opposite lateral faces depicted as 10 and 11 in the figures with the lateral face 10 being equipped with an opening 12 for accessing the cab 3 and the lateral face 11 being adjacent to the lifting arm 5 at least when said arm 5 is in the lowered position. The opening 12 for accessing the cab may be closed by a door.

As illustrated in the figures, the pivot axis for connecting the lifting arm 5 to the chassis 2 is positioned at the rear of the vehicle 1 so that when the lifting arm 5 is in the raised position it extends partially at a level higher than that of the roof of the cab 3. In the lowered position, this lifting arm 5 extends at least partially along the lateral face 11 of the cab 3.

Figure 2:
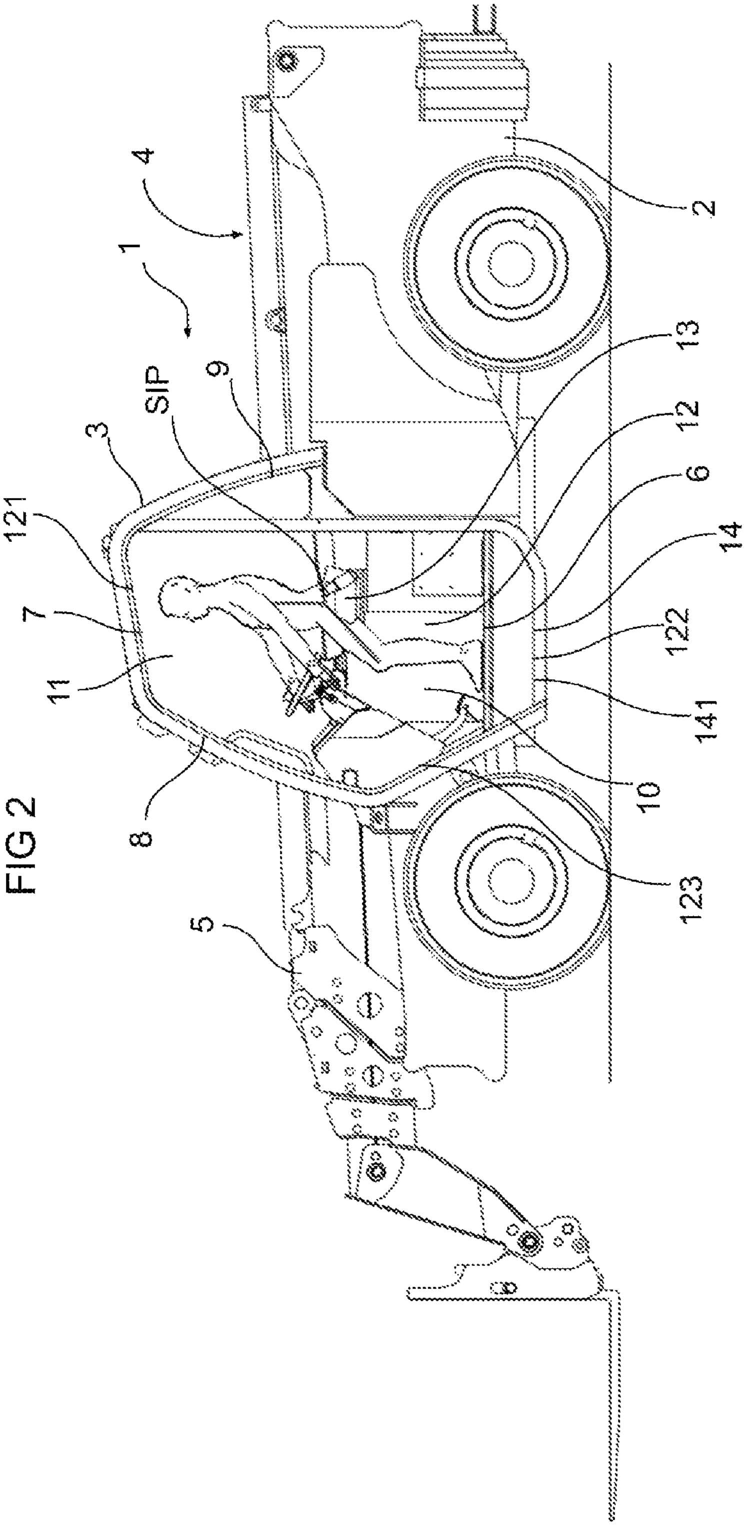
FIG. 2 depicts a schematic side view of a vehicle according to the disclosure, from the side via which the cab is accessed.
Figure 3:
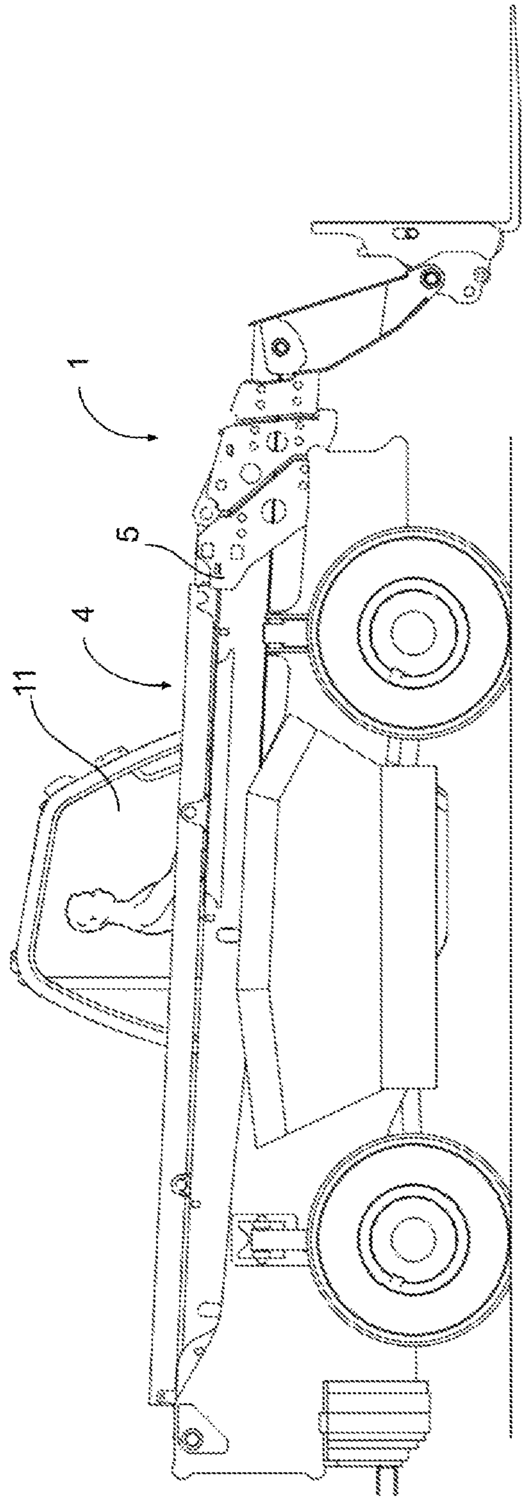
FIG. 3 depicts a schematic side view of a vehicle according to the disclosure, from the lifting-arm side.

This lateral positioning of the lifting arm 5 relative to the cab 3 means that the driver has to be positioned within the cab 3 in such a way that the driver's eyes are at a higher level than that of the lifting arm 5 when the lifting arm 5 is in the lowered position, as illustrated in FIG. 2, so as to allow the driver of the vehicle to have a peripheral view said to be a high level view.

It is for this reason that, in the prior art as illustrated in FIG. 1, the floor of the cab is very high up relative to ground level and numerous steps are required in order to access the cab.

This cab 3 is equipped with a seat 13 and has at least one seat index point referred to as SIP, established and defined in accordance with International standard ISO 5353:1995. This International standard corresponds to European standard EN ISO 5353:1998 which also has the status of a French standard NF EN ISO 5353, November 1998. This International standard prescribes a method and the device to be used for determining the seat index point SIP for any type of seat.

The seat index point SIP, as established and defined in the International standard, may be considered, so far as the cab design is concerned, as being the intersection on the central vertical plane through the seat center line of the theoretical pivot axis between the driver torso and thighs. The seat index point SIP is fixed with respect to the vehicle and does not move with the seat through its adjustment and/or oscillation range. This seat index point SIP is specified by the manufacturer of the vehicle.

To facilitate access to the cab 3 while at the same time maintaining the high level peripheral visibility for the driver of the vehicle 1, the cab 3 has a minimal interior height H measured between the floor 6 and the roof 7 at the seat index point SIP, which is to say plumb with or in line with said seat index point SIP, greater than 1705 mm. This height is far greater than that of cabs of the prior art which does not generally exceed 1550 mm.

It is recalled that, in the present description, what is meant by the "floor of the cab", when the vehicle is positioned on a flat horizontal surface, is the horizontal surface of the floor of the cab situated vertically beneath, which is to say plumb with, the seat, and on which the driver's feet bear when the driver stands up from or sits down on the seat.

Figure 7:
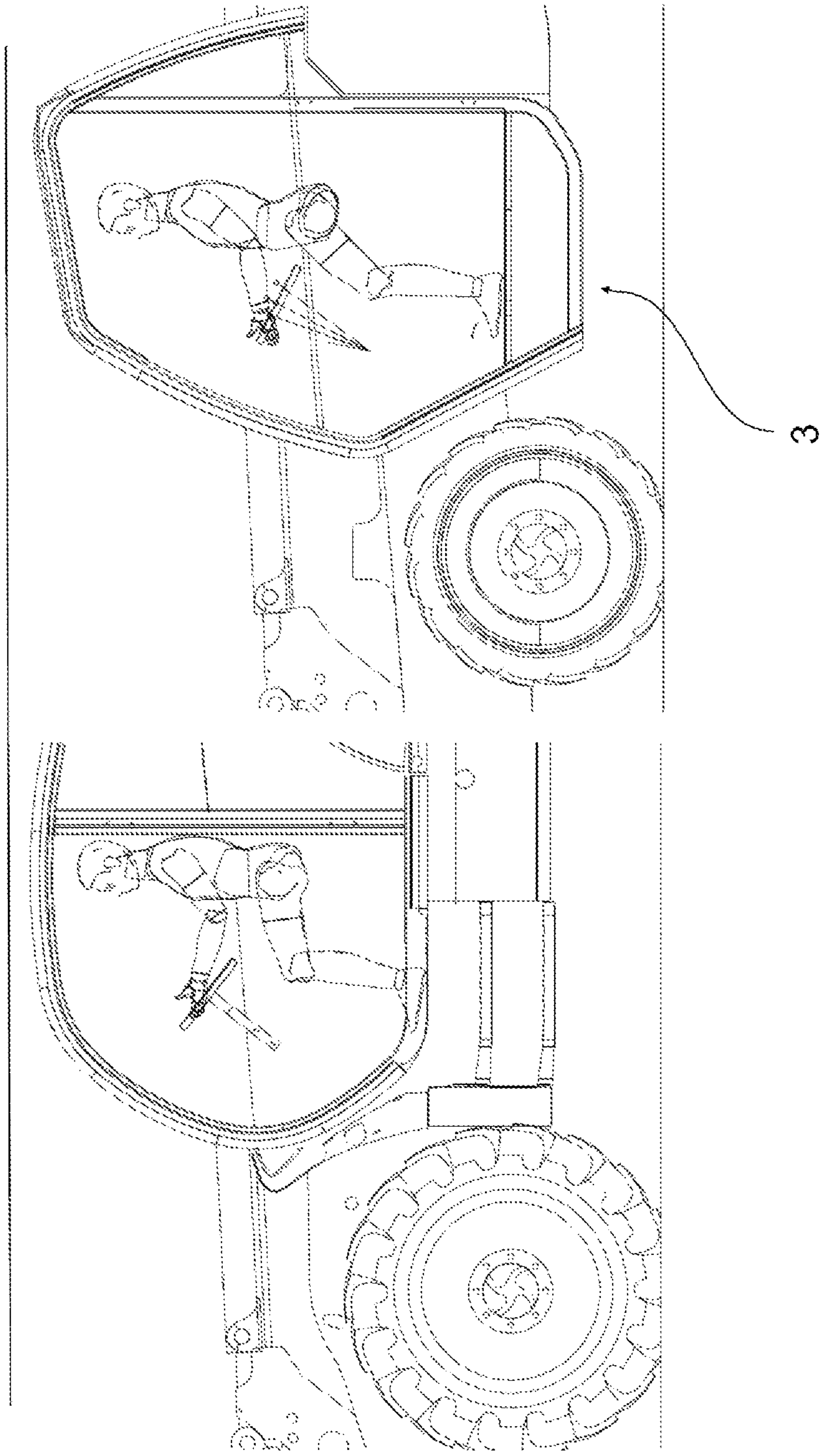
FIG. 7 depicts, in the form of two views, driver's cabs, the one on the left corresponding to the prior art and the other corresponding to the disclosure.

This height H allows the driver of the vehicle to occupy, when positioned on their seat, a semi upright position as illustrated in FIG. 7.

Moreover, the distance D1 between the floor 6 and the ground is less than 800 mm when the vehicle 1 is positioned on flat horizontal ground and the distance D2 between the or each seat index point SIP and the floor 6 of the cab 3 is at least equal to 650 mm and preferably less than 1045 mm.

All of these dimensional characteristics allow the driver of the vehicle to occupy, when seated on their seat, a semi upright position which is still comfortable while allowing the driver of the vehicle to climb up into and down from the cab with ease.

Figure 8:
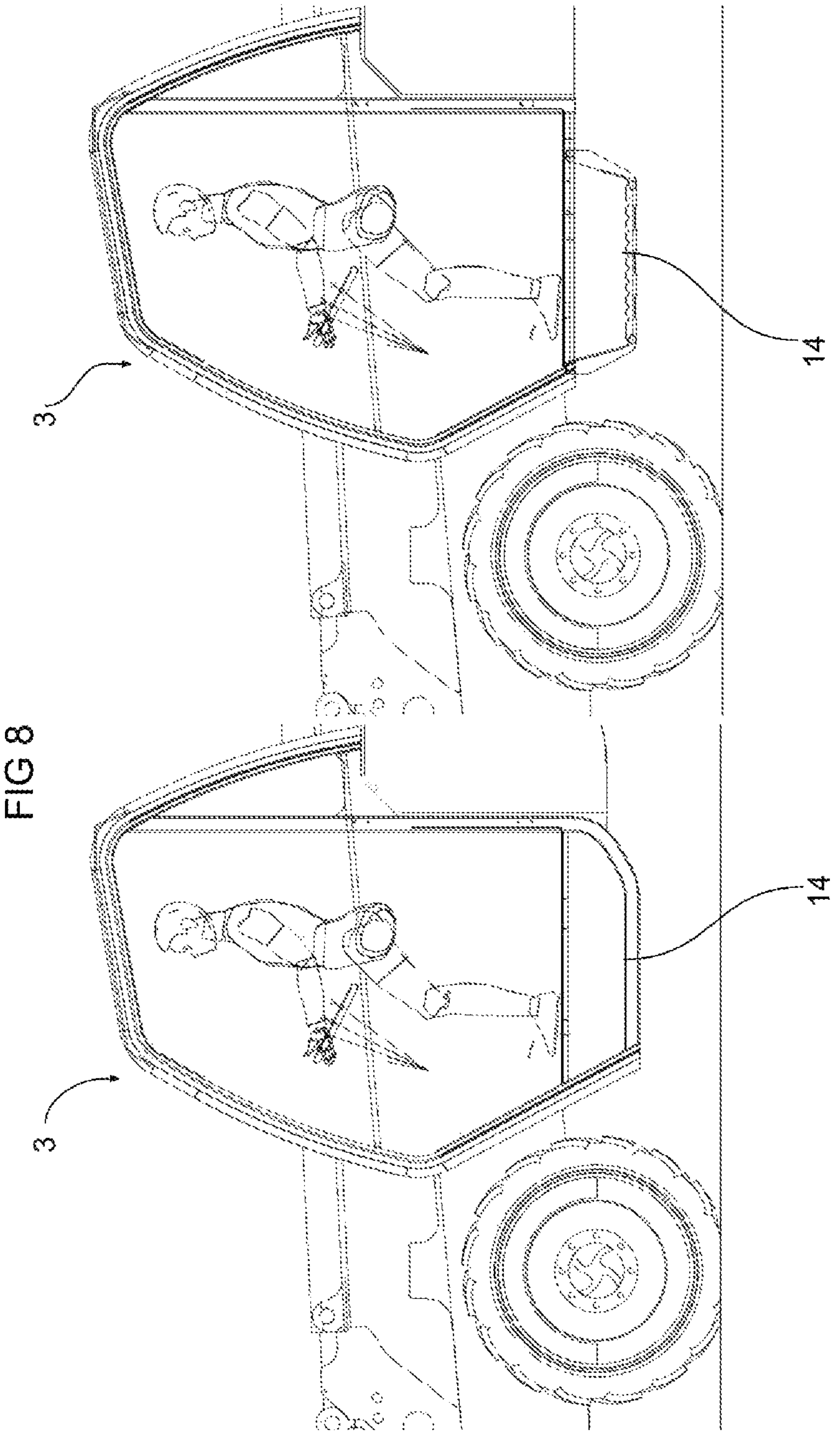
FIG. 8 depicts, in the form of two views, driver's cabs, the one on the left having the access step located inside the cab and the other having the access step located outside the cab.

To facilitate this climbing up into and down from the cab, the vehicle 1 has at least one step 14 for accessing the floor 6 of the cab 3. In the examples depicted, the vehicle 1 has a single step 14 for accessing the floor 6 of the cab 3. This access step 14 here is located inside the cab 3. As an alternative, this access step 14 may be positioned outside of the cab 3 as depicted in FIG. 8. As a further alternative, the vehicle 1 may have no step for accessing the floor of the cab.

Figure 4:
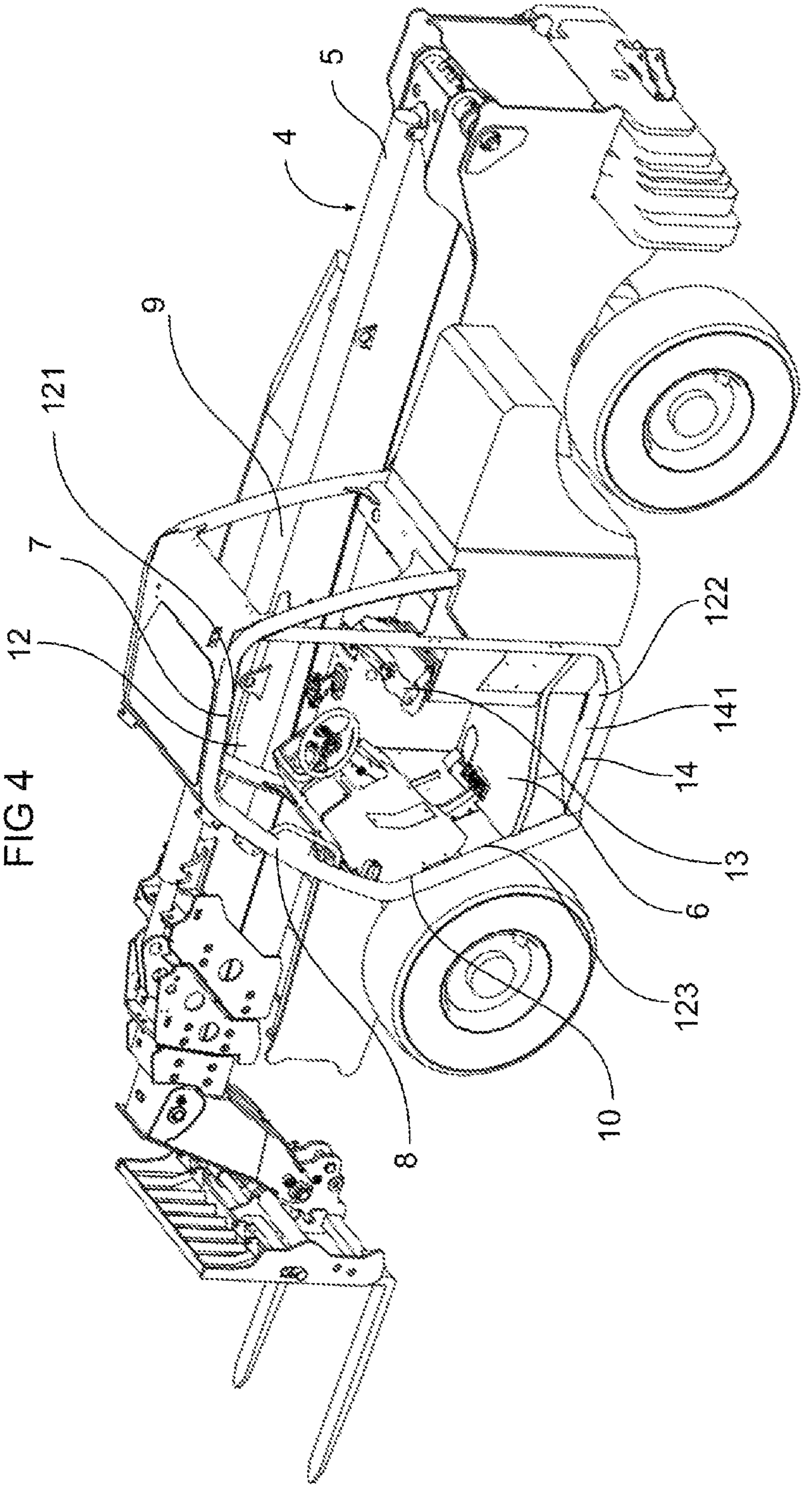
FIG. 4 depicts a schematic side view of a vehicle according to the disclosure, from the side via which the cab is accessed, in the absence of a driver.
Figure 5:
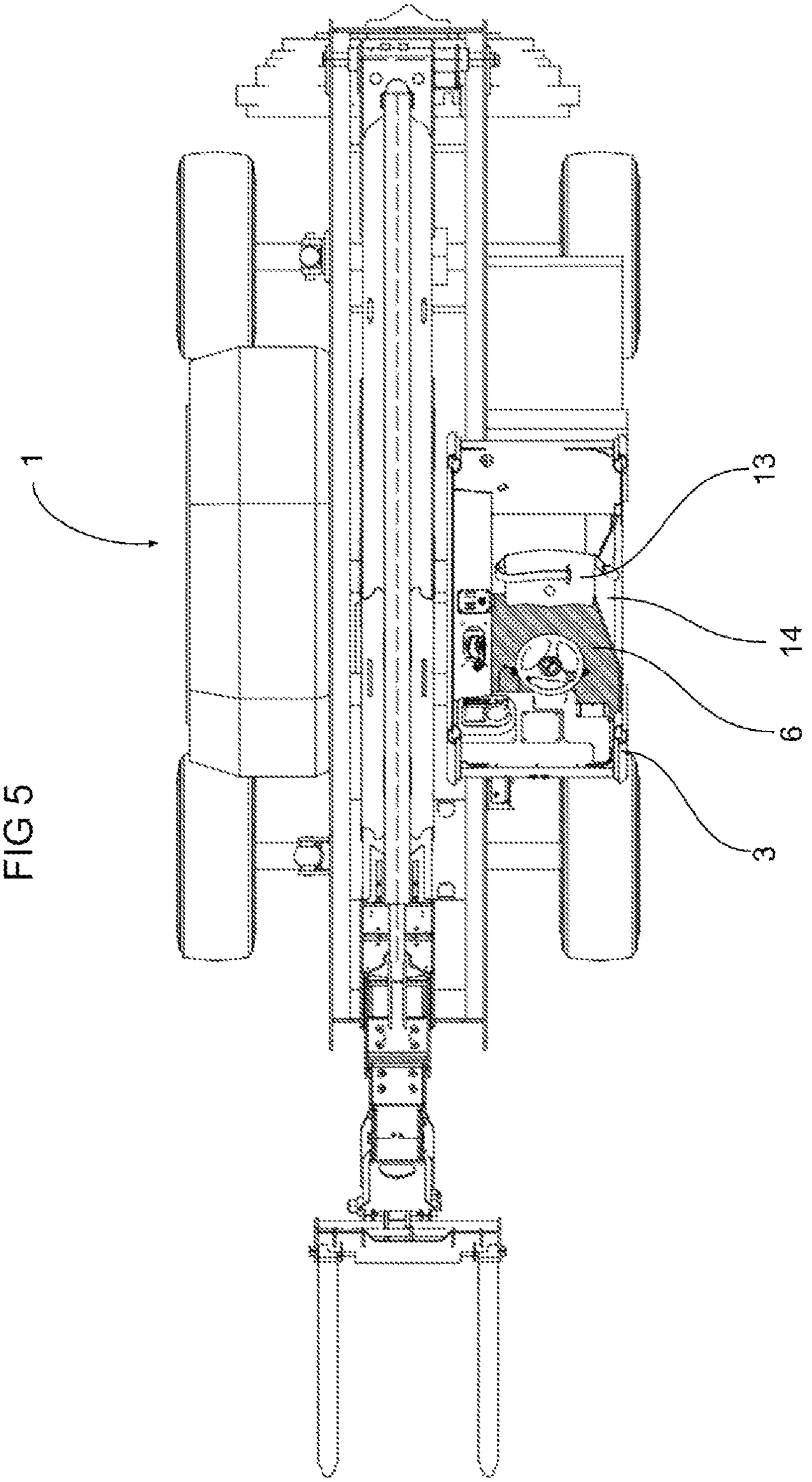
FIG. 5 depicts a schematic view, from above, of a vehicle according to the disclosure.
Figure 6:
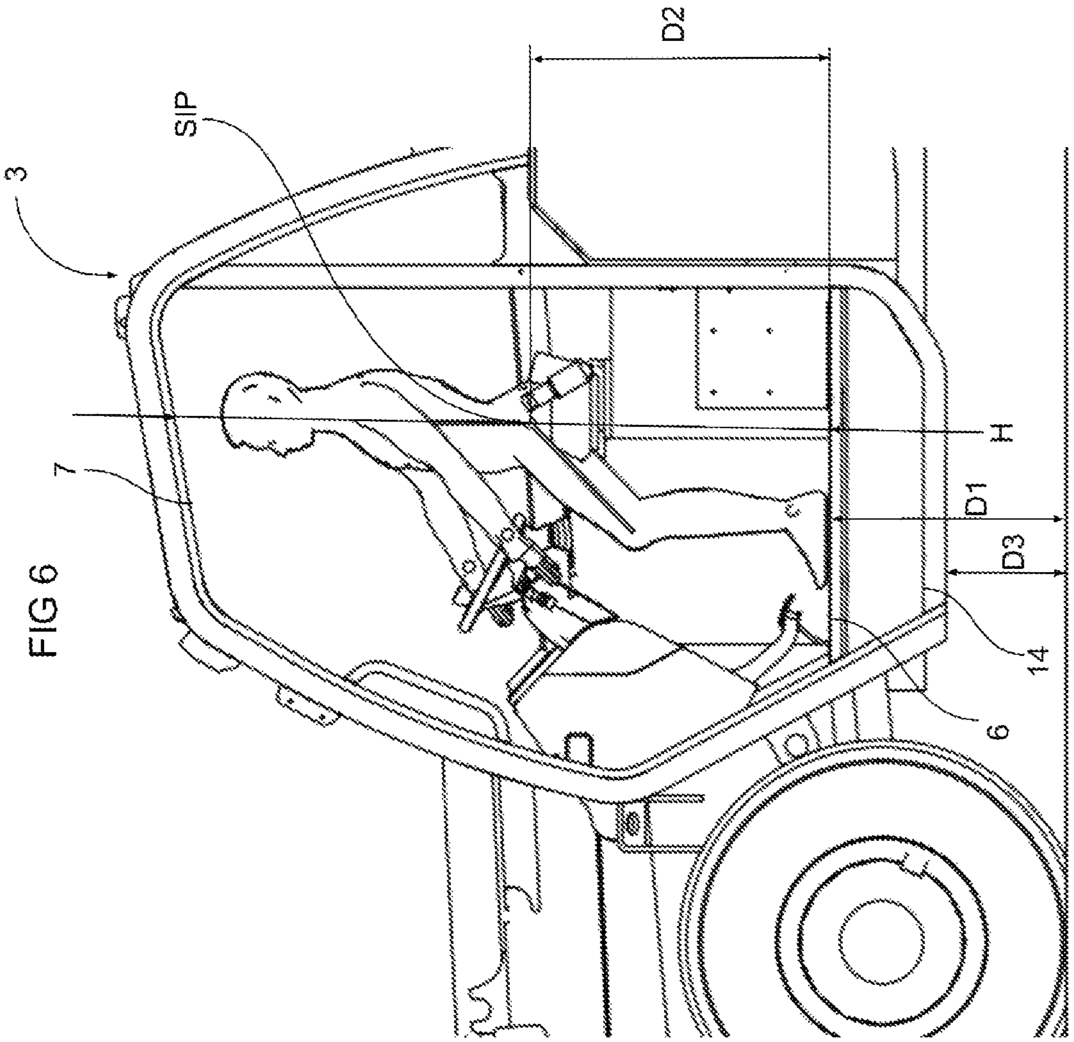
FIG. 6 depicts a schematic partial side view of a driver's cab of a vehicle according to the disclosure, from the side via which the cab is accessed.

Thus, in the example depicted in FIG. 4, the opening 12 for accessing the cab 3 is delimited by an upper edge 121, a lower edge 122 and lateral edges 123, and the step 14 for accessing the floor 6 of the cab has a tread 141, formed by the flat horizontal surface of the step on which the foot is placed, that is positioned at the level of the lower edge 122 of the opening 12 for accessing the cab 3. The tread 141 thus forms part of the base of the driver's cab 3 in this particular embodiment in which the access step is located inside the cab, which is to say inside the volume delimited by the cab and accessible via the opening for accessing said cab.

Independently of the design of the cab 3, which is to say irrespective of whether the step or steps 14 for accessing the cab 3 is/are inside or outside the cab 3, it is preferable for the floor 6 and the step 14 for accessing the floor and which is positioned immediately in front of the floor 6, considered relative to the direction of entry into the cab 3 through the access opening 12, to be offset from one another to form stairs. This layout offers greater safety than access steps and a floor which are arranged in the manner of a step ladder one above the other as is the case in the prior art.

Ideally, when the vehicle 1 is positioned on a flat horizontal surface, the lower edge 122 of the access opening 12 is separated from the ground by a distance D3 at least equal to 150 mm and preferably at most equal to 800 mm.

To perfect this lowering of the level of the floor 6 of the cab 3 relative to the ground, the cab 3 is positioned on the chassis 2 between the left front wheel and the left rear wheel of the vehicle 1, it being possible for the wheel base of the vehicle 1, together with the size of the wheels, to be adapted to suit.

The novel architecture of the driver's cab 3, as described hereinabove, makes climbing up into and down from the driver's cab easy without detracting from the comfort of the driver seated on their seat or from the peripheral vision of said driver.

The invention claimed is:

1. A load-handling vehicle comprising:

a chassis that is able to move along a ground;

a load-handling system supported by the chassis and including a lifting arm moveable between a raised position and a lowered position; and a cab supported by the chassis and including a floor, a roof, a front face, a rear face opposite the front face, first and second lateral faces, the first lateral face defining an opening for accessing the cab and closeable by a door, and the second lateral face being adjacent to the lifting arm when the lifting arm is in the lowered position, and a seat having a seat index point defined in accordance with International standard ISO 5353:1995, wherein the cab has an interior height measured between the floor and the roof through the seat index point that is greater than 1705 mm, a first distance between the floor and the ground that is less than 800 mm when the load-handling vehicle is positioned on flat horizontal ground, and a second distance between the seat index point and the floor of the cab that is at least 650 mm.

2. The load-handling vehicle of claim 1, wherein the second distance between the seat index point and the floor of the cab is less than 1045 mm.

3. The load-handling vehicle of claim 1, further comprising a step for accessing the floor of the cab.

4. The load-handling vehicle of claim 3, wherein the step is singular.

5. The load-handling vehicle of claim 3, wherein the step is located inside the cab.

6. The load-handling vehicle of claim 3, wherein the opening for accessing the cab is delimited by an upper edge, a lower edge, and lateral edges, and the step for accessing the floor of the cab has a tread located along the lower edge of the opening for accessing the cab.

7. The load-handling vehicle of claim 6, wherein when the load-handling vehicle is positioned on a flat horizontal surface, the lower edge of the opening is separated from the ground by a third distance between 150 mm and 800 mm, inclusive.

8. The load-handling vehicle of claim 3, wherein the floor and the step for accessing the floor are offset relative to one another to form stairs.

9. A load-handling vehicle comprising:

a chassis; and a cab supported by the chassis and including a floor, a roof, a lateral face defining an opening for accessing the cab, and a seat having a seat index point, wherein the cab has an interior height measured between the floor and the roof through the seat index point, the cab defines a first distance between the floor and a ground surface, the cab defines a second distance between the floor and the seat index point, the first distance is less than the second distance, the first distance is less than 800 mm when the load-handling vehicle is positioned on flat horizontal ground, and the second distance is at least 650 mm.

10. The load-handling vehicle of claim 9, wherein the second distance between the seat index point and the floor of the cab is less than 1045 mm.

11. The load-handling vehicle of claim 9, further comprising a step for accessing the floor of the cab.

12. The load-handling vehicle of claim 11, wherein the floor and the step are offset relative to one another to form stairs.

13. The load-handling vehicle of claim 11, wherein the step is located inside the cab.

14. The load-handling vehicle of claim 11, wherein the opening for accessing the cab is partially defined by a lower edge, and the step has a tread located along the lower edge.

15. The load-handling vehicle of claim 14, wherein when the load-handling vehicle is positioned on a flat horizontal surface, a third distance between the lower edge and the ground surface is between 150 mm and 800 mm, inclusive.

16. The load-handling vehicle of claim 11, wherein the interior height is plumb with the at least one seat index point when the load-handling vehicle is positioned on a flat horizontal surface.

17. A cab for a load-handling vehicle comprising:

a floor;

a roof opposite the floor;

a lateral face between the floor and the roof, the lateral face defining an opening; and a seat having a seat index point, wherein an interior height is defined between the floor and the roof through the seat index point, a first distance between the floor and a ground surface is less than the interior height, and a second distance between the seat index point and the floor is less than a third distance between the seat index point and the roof, and greater than the first distance.

18. The cab of claim 17, further comprising a step for accessing the floor.

19. The cab of claim 18, wherein the opening is partially defined by a lower edge, and the step has a tread located along the lower edge.

20. The cab of claim 18, wherein the floor and the step are offset relative to one another to form stairs.

* * * * *